United States Patent
Yun et al.

(10) Patent No.: US 7,845,335 B2
(45) Date of Patent: Dec. 7, 2010

(54) OPERATING STRATEGY FOR HCCI COMBUSTION DURING ENGINE WARM-UP

(75) Inventors: Hanho Yun, Oakland Township, MI (US); Nicole Wermuth, Ann Arbor, MI (US); Paul M. Najt, Bloomfield Hills, MI (US); Jun-Mo Kang, Ann Arbor, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 0 days.

(21) Appl. No.: 12/408,816

(22) Filed: Mar. 23, 2009

(65) Prior Publication Data

US 2010/0241341 A1  Sep. 23, 2010

(51) Int. Cl.
*F02M 7/28* (2006.01)
*F02P 5/00* (2006.01)
*F02D 41/06* (2006.01)

(52) U.S. Cl. ............ 123/435; 123/436; 123/406.55
(58) Field of Classification Search ............ 701/103, 701/110, 113; 123/435, 436, 406.18, 406.23, 123/406.24, 406.55, 406.58, 90.15, 305
See application file for complete search history.

(56) References Cited

U.S. PATENT DOCUMENTS

| | | | | |
|---|---|---|---|---|
| 6,085,718 A * | 7/2000 | Nishimura et al. | .......... | 123/295 |
| 6,116,208 A * | 9/2000 | Nishimura et al. | .......... | 123/295 |
| 6,257,197 B1 * | 7/2001 | Nishimura et al. | .......... | 123/295 |
| 6,449,946 B2 * | 9/2002 | Kuji et al. | .......... | 60/286 |
| 6,513,320 B1 * | 2/2003 | Nishimura et al. | .......... | 60/285 |
| 6,840,201 B2 * | 1/2005 | Miura | .......... | 123/90.15 |
| 6,978,771 B2 * | 12/2005 | Kuzuyama et al. | ..... | 123/568.11 |
| 6,990,947 B2 * | 1/2006 | Kuzuyama et al. | .......... | 123/294 |
| 7,168,420 B1 * | 1/2007 | Yang | .......... | 123/568.15 |
| 7,213,572 B2 * | 5/2007 | Yang | .......... | 123/406.11 |
| 7,234,438 B2 * | 6/2007 | Yang | .......... | 123/295 |
| 7,240,659 B2 * | 7/2007 | Yang | .......... | 123/295 |
| 7,302,928 B2 * | 12/2007 | Satou et al. | .......... | 123/295 |
| 7,318,420 B2 * | 1/2008 | Kinose | .......... | 123/479 |
| 7,412,322 B1 | 8/2008 | Rask et al. | | |
| 7,669,578 B2 * | 3/2010 | Yamashita et al. | .......... | 123/295 |
| 7,684,925 B2 * | 3/2010 | Kuo et al. | .......... | 701/113 |
| 2003/0172888 A1 * | 9/2003 | Miura | .......... | 123/90.16 |
| 2007/0000478 A1 * | 1/2007 | Sadakane et al. | .......... | 123/431 |
| 2007/0289577 A1 * | 12/2007 | Yamaguchi et al. | .......... | 123/446 |
| 2009/0205612 A1 | 8/2009 | Wermuth et al. | | |
| 2009/0272362 A1 | 11/2009 | Yun et al. | | |
| 2010/0037859 A1 * | 2/2010 | Mashiki | .......... | 123/406.33 |

OTHER PUBLICATIONS

U.S. Appl. No. 12/395,747, Yun, et al.

* cited by examiner

*Primary Examiner*—Hai H Huynh (57) ABSTRACT

An engine operating in a spark-assisted homogeneous charge compression ignition mode during warm-up cycle is controlled using settings determined by interpolating between cold engine temperature settings fully warmed-up engine temperature settings.

20 Claims, 10 Drawing Sheets

OPERATING STRATEGY FOR HCCI COMBUSTION DURING ENGINE WARM-UP

TECHNICAL FIELD

This invention relates to internal combustion engines, and more specifically to controlling operation thereof.

BACKGROUND OF THE INVENTION

The statements in this section merely provide background information related to the present disclosure and may not constitute prior art.

Internal combustion engines, especially automotive internal combustion engines, generally fall into one of two categories, spark ignition engines and compression ignition engines. Traditional spark ignition engines, such as gasoline engines, typically function by introducing a fuel/air mixture into the combustion cylinders, which is then compressed in the compression stroke and ignited by a spark plug. Traditional compression ignition engines, such as diesel engines, typically function by introducing or injecting pressurized fuel into a combustion cylinder near top dead center (TDC) of the compression stroke, which ignites upon injection. Combustion for both traditional gasoline engines and diesel engines involves premixed or diffusion flames that are controlled by fluid mechanics. Each type of engine has advantages and disadvantages. In general, gasoline engines produce fewer emissions but are less efficient, while, in general, diesel engines are more efficient but produce more emissions.

More recently, other types of combustion methodologies have been introduced for internal combustion engines. One of these combustion concepts is known in the art as the homogeneous charge compression ignition (HCCI). The HCCI operating mode comprises a distributed, flameless, auto-ignition combustion process that is controlled by oxidation chemistry, rather than by fluid mechanics. In a typical engine operating in HCCI operating mode, the cylinder charge is nearly homogeneous in composition, temperature, and residual level at intake valve closing time. The typical engine operating in the HCCI operating mode can further operate using stratified charge fuel injection to control and modify the combustion process, including using stratified charge combustion to trigger the HCCI combustion. Because auto-ignition is a distributed kinetically-controlled combustion process, the engine operates at a very dilute fuel/air mixture (i.e., lean of a fuel/air stoichiometric point) and has a relatively low peak combustion temperature, thus forming extremely low nitrous oxides (NOx) emissions. The fuel/air mixture for auto-ignition is relatively homogeneous, as compared to the stratified fuel/air combustion mixtures used in diesel engines, and, therefore, the rich zones that form smoke and particulate emissions in diesel engines are substantially eliminated. Because of this very dilute fuel/air mixture, an engine operating in the auto-ignition operating mode can operate unthrottled to achieve diesel-like fuel economy. The HCCI engine can operate at stoichiometry with substantial amounts of EGR to achieve effective combustion.

At medium engine speeds and loads, a combination of valve profile and timing (e.g., exhaust recompression and exhaust re-breathing) and fueling strategy has been found to be effective in providing adequate thermal energy to the cylinder charge so that auto-ignition during the compression stroke leads to stable combustion with low noise. One of the main issues in effectively operating an engine in the auto-ignition operating mode has been to control the combustion process properly so that robust and stable combustion resulting in low emissions, optimal heat release rate, and low noise can be achieved over a range of operating conditions. The benefits of auto-ignition combustion have been known for many years. The primary barrier to product implementation, however, has been the inability to control the auto-ignition combustion process, i.e., combustion phasing and rate of combustion. Late phasing or very slow combustion will result in partial burns and even possibly misfires. Too early phasing or too rapid combustion will lead to knock.

There is no direct control of start of combustion for an engine operating in the auto-ignition mode, as the chemical kinetics of the cylinder charge determine the start and course of the combustion. Chemical kinetics are sensitive to temperature and, as such, the controlled auto-ignition combustion process is sensitive to temperature. An important variable affecting the combustion initiation and progress is the effective temperature of the cylinder structure, i.e., temperature of cylinder walls, head, valve, and piston crown.

Temperature within the combustion chamber of an engine is transient during an engine warm-up cycle. Controlling HCCI operation through a warm-up cycle can therefore be difficult. Calibration techniques are known to include incrementally testing an engine at incremental operating points through an entire operating region, mapping out settings to operate the engine for every engine speed, engine load, and engine temperature. This process of calibrating an engine is intensive and can take a long time to perform.

SUMMARY OF THE INVENTION

An internal combustion engine operates in a spark-assisted homogeneous charge compression ignition mode in a warm-up cycle. A method for controlling the engine in an operating region wherein a current engine state including an engine speed, an engine load, and an engine temperature indicates a single operating strategy can be utilized throughout the warm-up cycle includes monitoring the engine speed, monitoring the engine load, monitoring the engine temperature. The method further includes determining settings to operate the engine by interpolating according to the monitored engine temperature between settings to operate the engine at the monitored engine speed and load calibrated at a cold engine temperature and settings to operate the engine at the monitored engine speed and load calibrated at a fully warmed-up engine temperature. The determined settings are utilized to control operation of the engine.

BRIEF DESCRIPTION OF THE DRAWINGS

The invention may take physical form in certain parts and arrangement of parts, the embodiments of which are described in detail and illustrated in the accompanying drawings which form a part hereof, and wherein:

FIGS. 13 and 14 describe a functional relationship for injection timing and spark timing during recompression in an engine utilizing MIMI through a range of coolant temperatures, in accordance with the present disclosure;

FIGS. 15 and 16 describe a functional relationship for NVO and AF ratio through a range of coolant temperatures, in accordance with the present disclosure;

DESCRIPTION OF THE PREFERRED EMBODIMENT

Figure 1:
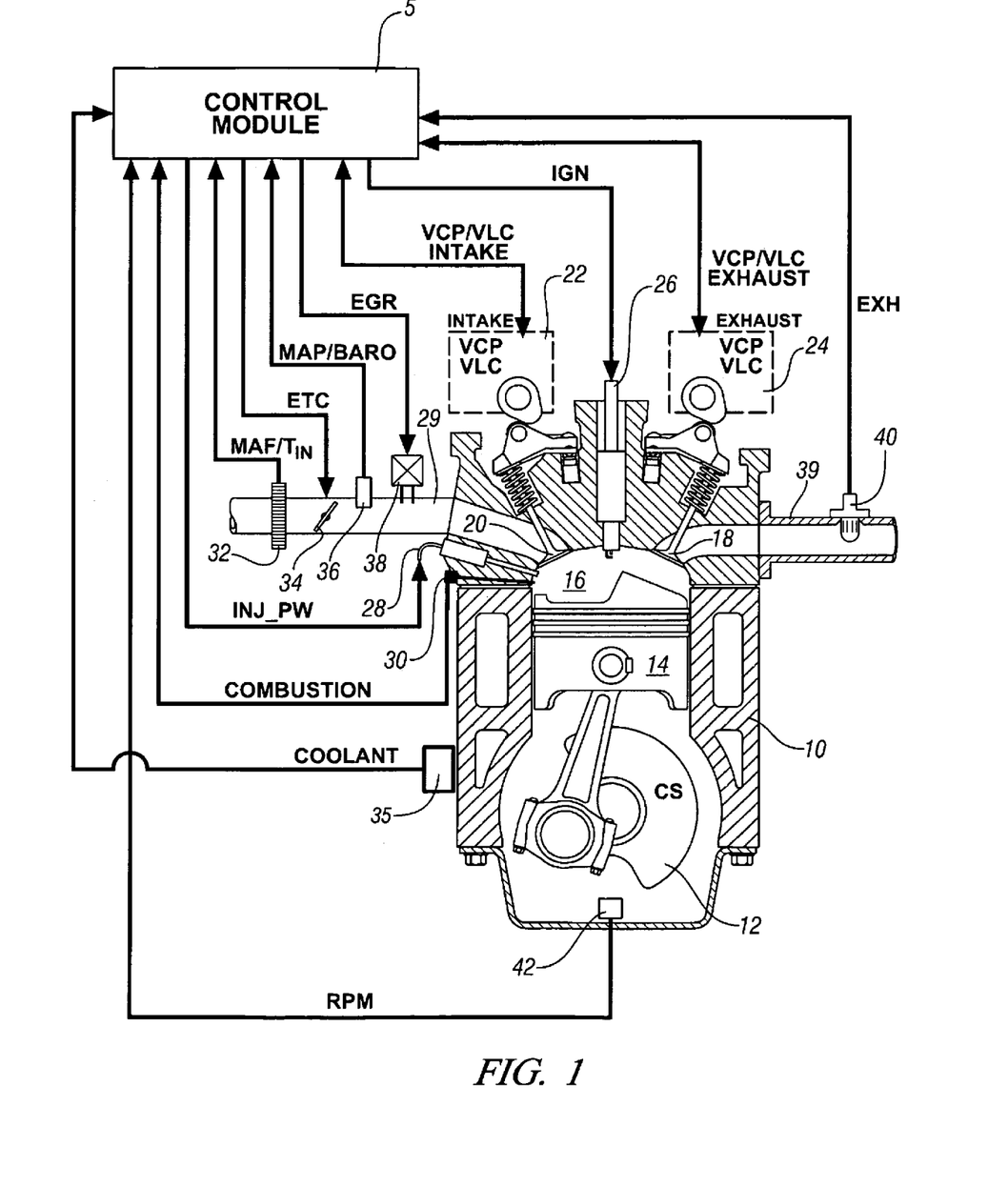
FIG. 1 schematically shows an internal combustion engine and an accompanying control module, in accordance with the present disclosure.

Referring now to the drawings, wherein the depictions are for the purpose of illustrating the invention only and not for the purpose of limiting the same, FIG. 1 schematically shows an internal combustion engine and an accompanying control module, in accordance with the present disclosure. The engine 10 may be selectively operative in a plurality of operating modes, including a controlled auto-ignition operating mode (HCCI), a homogeneous spark-ignition (SI-H) operating mode, and a stratified-charge spark-ignition (SC-SI) operating mode. The engine 10 is selectively operative at a stoichiometric air/fuel ratio and at an air/fuel ratio that is primarily lean of stoichiometry. The disclosure can be applied to various internal combustion engine systems and combustion cycles.

In one embodiment the engine 10 can be coupled to a transmission device (not shown) to transmit tractive power to a driveline of a vehicle (not shown). A transmission can include a hybrid transmission including torque machines operative to transfer tractive power to a driveline.

The exemplary engine 10 comprises a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which linear reciprocating motion is translated to rotational motion. An air intake system provides intake air to an intake manifold 29 which directs and distributes air into intake runners of the combustion chambers 16. The air intake system comprises airflow ductwork and devices for monitoring and controlling the air flow. The air intake devices preferably include a mass airflow sensor 32 for monitoring mass airflow and intake air temperature. A throttle valve 34 preferably comprises an electronically controlled device that is used to control air flow to the engine 10 in response to a control signal (ETC) from the control module 5. A pressure sensor 36 in the intake manifold 29 is configured to monitor manifold absolute pressure and barometric pressure. An external flow passage recirculates exhaust gases from engine exhaust to the intake manifold 29, having a flow control valve referred to as an exhaust gas recirculation (EGR) valve 38. The control module 5 is operative to control mass flow of exhaust gas to the intake manifold 29 by controlling opening of the EGR valve 38. The combustion chambers 16 are fluidly connected to an exhaust manifold 39 via the exhaust valves 18. Coolant sensor 35 monitors coolant temperature and provides a signal to control module 5.

Air flow from the intake manifold 29 into each of the combustion chambers 16 is controlled by one or more intake valves 20. Flow of combusted gases from the combustion chambers 16 to the exhaust manifold 39 is controlled by one or more exhaust valves 18. Openings and closings of the intake and exhaust valves 20 and 18 are preferably controlled with a dual camshaft (as depicted), the rotations of which are linked and indexed with rotation of the crankshaft 12. In one embodiment, the engine 10 is equipped with devices for controlling valve lift of the intake valves and the exhaust valves, referred to as variable lift control (VLC) devices. The VLC devices are operative to control valve lift, or opening, to one of two distinct steps in one embodiment. The two distinct steps include a low-lift valve opening (about 4-6 mm) for low speed, low load engine operation, and a high-lift valve opening (about 8-10 mm) for high speed, high load engine operation. The engine 10 is further equipped with devices for controlling phasing (i.e., relative timing) of opening and closing of the intake and exhaust valves 20 and 18, referred to as variable cam phasing (VCP), to control phasing beyond that which is effected by the two-step VLC lift. In one embodiment, there is a VCP/VLC system 22 for the intake valves 20 and a VCP/VLC system 24 for the engine exhaust valves 18. The VCP/VLC systems 22 and 24 are controlled by the control module 5, and provide signal feedback to the control module 5 through camshaft rotation position sensors for the intake camshaft (not shown) and the exhaust camshaft (not shown). The intake and exhaust VCP/VLC systems 22 and 24 have limited ranges of authority over which opening and closing of the intake and exhaust valves 20 and 18 can be adjusted and controlled. VCP systems can have a range of phasing authority of about 60°-90° of camshaft rotation, thus permitting the control module 5 to advance or retard opening and closing of one or both of the intake and exhaust valves 20 and 18. The range of phasing authority is defined and limited by the hardware of the VCP and the control system which actuates the VCP. The intake and exhaust VCP/VLC systems 22 and 24 may be actuated using one of electro-hydraulic, hydraulic, and electric control force, controlled by the control module 5. The control module 5 may adjust the intake and exhaust VCP/VLC systems 22 and 24 to achieve negative valve overlap (NVO).

The engine 10 includes a fuel injection system, comprising a plurality of high-pressure fuel injectors 28 each configured to directly inject a mass of fuel into one of the combustion chambers 16 in response to a signal from the control module 5. The fuel injectors 28 are supplied pressurized fuel from a fuel distribution system (not shown).

The engine 10 includes a spark-ignition system (not shown) by which spark energy can be provided to a spark plug 26 for igniting or assisting in igniting cylinder charges in each of the combustion chambers 16 in response to a signal (IGN) from the control module 5.

The engine 10 is equipped with various sensing devices for monitoring engine operation, including a crank sensor 42 having output (RPM) and operative to monitor crankshaft rotational position, i.e., crank angle and speed, in one embodiment a combustion sensor 30 configured to monitor combustion, and an exhaust gas sensor 40 configured to monitor exhaust gases, typically an air/fuel ratio sensor. The combustion sensor 30 comprises a sensor device operative to monitor a state of a combustion parameter and is depicted as a cylinder pressure sensor operative to monitor in-cylinder combustion pressure. The output of the combustion sensor 30 and the crank sensor 42 are monitored by the control module 5 which determines combustion phasing, i.e., timing of combustion pressure relative to the crank angle of the crankshaft 12 for each cylinder 15 for each combustion cycle. The combustion sensor 30 can also be monitored by the control module 5 to determine a mean-effective-pressure (IMEP) for each cylinder 15 for each combustion cycle. Preferably, the engine 10 and control module 5 are mechanized to monitor and determine states of IMEP for each of the engine cylinders 15 during each cylinder firing event. Alternatively, other sensing systems can be used to monitor states of other combustion parameters within the scope of the disclosure, e.g., ion-sense ignition systems, and non-intrusive cylinder pressure sensors.

The control module 5 is preferably a general-purpose digital computer comprising a microprocessor or central processing unit, storage mediums comprising non-volatile memory including read only memory and electrically programmable read only memory, random access memory, a high speed clock, analog to digital and digital to analog circuitry, and input/output circuitry and devices and appropriate signal conditioning and buffer circuitry. The control module has a set of control algorithms, comprising resident program instructions and calibrations stored in the non-volatile memory and executed to provide the respective functions of each computer. The algorithms are preferably executed during preset loop cycles. Algorithms are executed by the central processing unit and are operable to monitor inputs from the aforementioned sensing devices and execute control and diagnostic routines to control operation of the actuators, using preset calibrations. Loop cycles may be executed at regular intervals, for example each 3.125, 6.25, 12.5, 25 and 100 milliseconds during ongoing engine and vehicle operation. Alternatively, algorithms may be executed in response to occurrence of an event.

In operation, the control module 5 monitors inputs from the aforementioned sensors to determine states of engine parameters. The control module 5 is configured to receive input signals from an operator (e.g., a throttle pedal position and a brake pedal position) to determine an operator torque request and from the sensors indicating the engine speed and intake air temperature, and coolant temperature and other ambient conditions.

The control module 5 executes algorithmic code stored therein to control the aforementioned actuators to form the cylinder charge, including controlling throttle position, spark-ignition timing, fuel injection mass and timing, EGR valve position to control flow of recirculated exhaust gases, and intake and/or exhaust valve timing and phasing on engines so equipped. Valve timing and phasing can include NVO and lift of exhaust valve reopening (in an exhaust re-breathing strategy) in one embodiment. The control module 5 can operate to turn the engine on and off during ongoing vehicle operation, and can operate to selectively deactivate a portion of the combustion chambers or a portion of the valves through control of fuel and spark and valve deactivation. The control module 5 can control air/fuel ratio based upon feedback from exhaust gas sensor 40.

Figure 2:
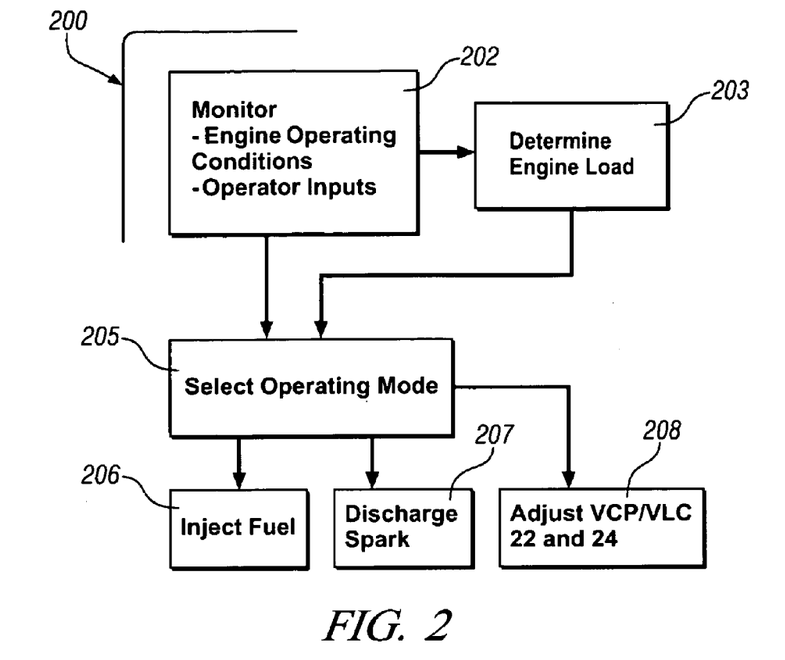
FIG. 2 is a control flow chart of a fuel injection control scheme, in accordance with the present disclosure.

FIG. 2 is a control flow chart of a fuel injection control scheme, in accordance with the present disclosure. Control scheme 200 is preferably executed as one or more algorithms in the control module 5. The control scheme 200 comprises monitoring engine operating conditions including engine speed, intake air temperature, intake air mass, and cylinder pressure, and operator inputs including the operator torque request in step 202. The engine load is determined based upon the operator torque request, the intake air mass, and parasitic loads, e.g., HVAC, battery charges, and electric loads in step 203. Engine speed is monitored by the crank sensor 42. Intake air temperature and intake air mass are monitored by the mass airflow sensor 32. Cylinder pressure is monitored by the combustion sensor 30.

One of a plurality of operating modes is selected for fueling and controlling the engine 10 based upon states of engine parameters including engine speed and load in step 205. The control module 5 controls fuel injection in step 206, spark discharge in step 207, and the intake and exhaust VCP/VLC systems 22 and 24 in step 208 corresponding to the selected operating mode.

Figure 3:
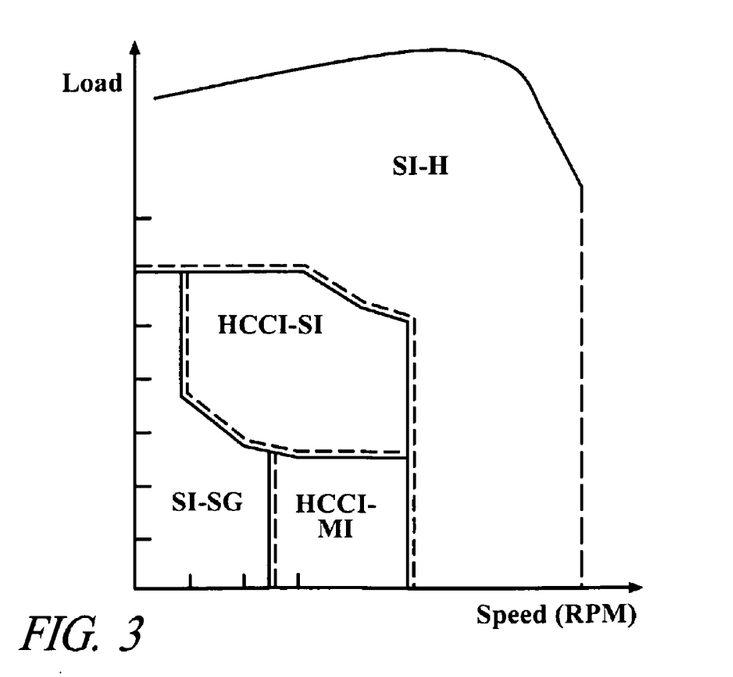
FIG. 3 graphically illustrates exemplary operating modes defined by speed and load ranges, in accordance with the present disclosure.

FIG. 3 graphically illustrates exemplary operating modes defined by speed and load ranges, in accordance with the present disclosure. The exemplary engine is selectively operative in one of a plurality of operating modes, based upon engine operating states, in this embodiment comprising engine speed and load, which is derivable from engine operating parameters such as injector fuel flow (INJ_PW, in milligrams), or mass air flow (MAF) or, manifold pressure (MAP). The engine operating modes comprise a spray-guided spark-ignition (SI-SG) mode, a single injection auto-ignition (HCCI-SI) mode, and multiple injection auto-ignition (HCCI-MI) mode, and a homogeneous spark-ignition (SI-H) mode. A preferred speed and load operating range for each of the operating modes is based upon optimum engine operating parameters, including combustion stability, fuel consumption, emissions, engine torque output, and others. Boundaries which define the preferred speed and load operating ranges to delineate the operating modes are typically determined during pre-production engine calibration and development, and are executed in the engine control module. In operation, the control system monitors the engine speed and load, and commands operation of the engine into one of the engine operating modes based thereon, as depicted with reference to FIG. 3. Thus at low speed/load conditions, SI-SG combustion is commanded, whereas in the medium speed/load operating conditions, auto-ignition combustion is commanded.

The engine 10 can transition between the various operating modes of FIG. 3 to achieve preferred targets related to fuel consumption, emissions, and engine stability, among other considerations and corresponding to engine speed and load. As one having ordinary skill in the art will recognize, many operating modes can be utilized to different preferred speed and load operating zones, and a number of strategies for extending ranges of different modes are known to exist.

In one embodiment, the SI-H mode includes a single fuel injection event corresponding to the intake phase of an engine cycle to achieve a mean best torque. Fuel mass discharge for the single fuel injection event corresponds to the operator torque request. This operating mode includes operation of engine 10 primarily for providing transmitting tractive torque to the driveline under high speed and high load operation.

In one embodiment, the HCCI-SI mode includes operating the engine 10 lean in a single injection auto-ignition operating mode. The control scheme 200 executes one fuel injection event preferably during the intake phase of an engine cycle. A fuel mass discharge for the fuel injection event is based upon the operator torque request.

Figure 4:
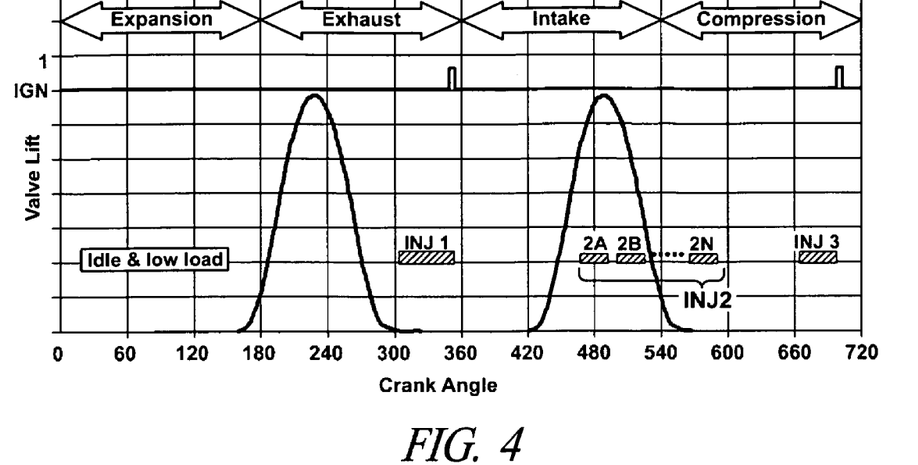
FIG. 4 graphically illustrates exemplary execution of the HCCI-MI mode over a four stroke engine cycle of the engine, in accordance with the present disclosure.

FIG. 4 graphically illustrates exemplary execution of the HCCI-MI mode over a four stroke engine cycle of the engine, in accordance with the present disclosure. In particular, a multiple injection multiple ignition (MIMI) operating mode is described. FIG. 4 depicts valve lift (Valve Lift) with respect to crank angle (Crank Angle) for an engine cycle. The four stroke engine cycle includes sequentially repeating four phases: (1) expansion; (2) exhaust; (3) intake; and (4) compression. During NVO, a recompression phase begins when the exhaust valve 18 is closed and ends when the piston 14 is at TDC. After the piston 14 recedes from TDC, recompression is completed and the combustion chamber 16 expands. NVO subsequently ends when the intake valve 20 opens.

Figure 5:
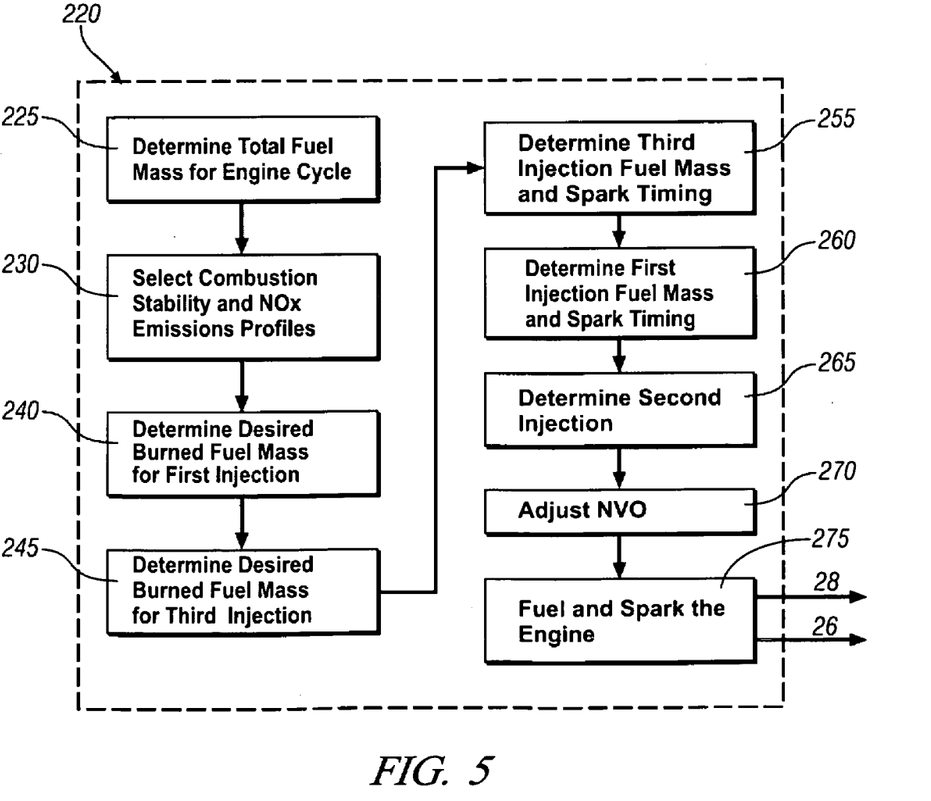
FIG. 5 illustrates operation of MIMI operation, described with reference to FIG. 4, in accordance with the present disclosure.

FIG. 5 illustrates operation of MIMI operation, described with reference to FIG. 4, in accordance with the present disclosure. The mode comprises operating the engine lean and executing a plurality of fuel injection events each engine cycle. A first fuel injection event is executed during the recompression phase. A second fuel injection event is selectively executed substantially during the intake phase and may continue into the beginning of the compression phase, i.e., from the start of the compression phase to a midpoint of the compression phase. The second fuel injection event may selectively occur. A third fuel injection event is executed substantially during the ending of the compression phase, i.e., from a midpoint of the compression phase to substantially piston TDC. Spark discharge events are executed following the first and third fuel injection events from the spark plug 26. As one having ordinary skill in the art will recognize, executing the first, second, and third fuel injection events each comprises injecting at least one fuel pulse by actuating the fuel injector 28. For example, FIG. 4 shows multiple fuel pulses (2A, 2B . . . 2N) for the second fuel injection event.

Desired burned fuel mass for each of the first and third fuel injection events is determined based upon engine out NOx emissions and combustion stability considerations. The fuel mass burned during the recompression phase can be correlated to combustion stability, e.g., COV of IMEP. The fuel mass burned during the recompression phase can be correlated to NOx emissions. As more fuel is reformed during recompression, the NOx emissions decrease; however, combustion stability decreases (COV of IMEP increases). Conversely, as more fuel is burned during the third fuel injection event, the compression phase, NOx emissions increase and combustion stability increases (COV of IMEP decreases).

In operation, the desired burned fuel mass for the first fuel injection event is determined based upon NOx emissions, thereby minimizing NOx emissions, and the desired burned fuel mass for the third fuel injection event is determined based upon combustion stability, thereby maximizing combustion stability. NOx emissions and combustion stability data may be experimentally determined for a specific hardware application and for varying engine operating conditions with respect to burned fuel mass for the first and third fuel injection events. NOx emissions and combustion stability profiles may be created based upon the experimentally determined data for ranges of engine operating conditions. The profiles may be indexed and stored in the control module 5. The NOx emissions and combustion stability profiles may then be selected and used corresponding to the monitored engine operating conditions. Engine operating conditions include, for example, thermal conditions in the cylinder, intake air temperature, and cylinder pressure.

A predetermined maximum NOx emissions threshold for the first fuel injection event, and a predetermined maximum combustion instability threshold for the third fuel injection event are stored in the control module 5. A maximum NOx threshold for the first fuel injection event and a maximum combustion instability threshold for the third fuel injection event permit a minimum fuel quantity to be injected in the first and third fuel injection events thereby minimizing NOx emissions and combustion instability. The thresholds described may be developed experimentally, empirically, predictively, through modeling or other techniques adequate to accurately predict engine operation, and a multitude of calibration curves might be used by the same engine for each cylinder and for different engine settings, conditions, or operating ranges.

Figure 6:
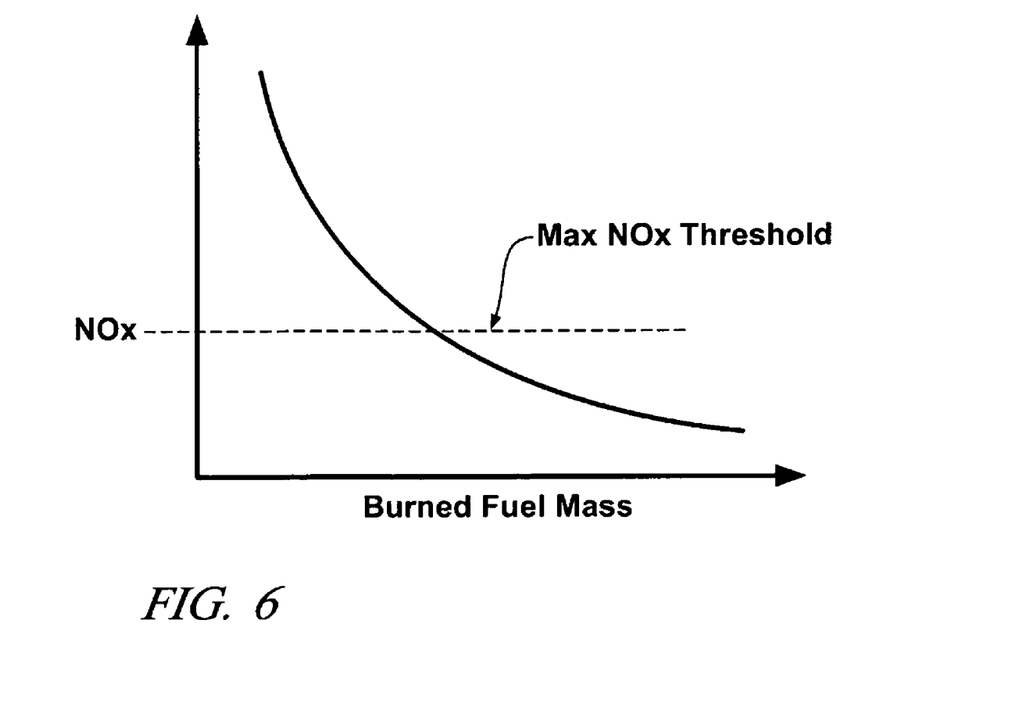
FIG. 6 graphically illustrates an exemplary NOx emissions profile for a first fuel injection event, in accordance with the present disclosure.

Exemplary methods to utilize the described thresholds are disclosed. FIG. 6 graphically illustrates an exemplary NOx emissions profile for a first fuel injection event, in accordance with the present disclosure. NOx emissions profiles are experimentally determined for a specific hardware application and for varying engine operating conditions in one embodiment. The NOx emissions profiles are preferably stored in memory of the control module 5. A predetermined NOx emissions profile is selected based upon the engine operating conditions. The predetermined maximum NOx emissions threshold is used to determine the desired burned fuel mass for the first fuel injection event. The predetermined maximum NOx emissions threshold is used to determine a corresponding desired burned fuel mass. The corresponding desired burned fuel mass is the desired burned fuel mass for the first fuel injection event.

Figure 7:
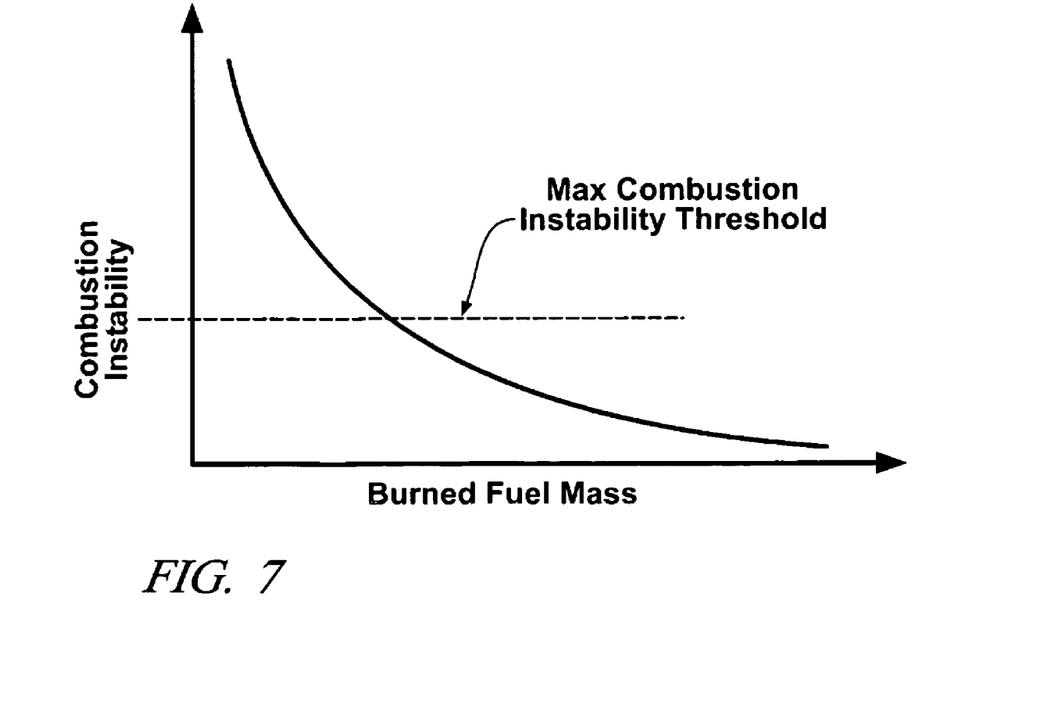
FIG. 7 graphically illustrates an exemplary combustion instability profile for a third fuel injection event, in accordance with the present disclosure.

FIG. 7 graphically illustrates an exemplary combustion instability profile for a third fuel injection event, in accordance with the present disclosure. Combustion instability profiles are experimentally determined for a specific hardware application and for varying engine operating conditions. The profiles are stored in memory of the control module 5. A predetermined combustion instability profile is selected based upon engine operating conditions. The predetermined maximum combustion instability threshold is used to determine the desired burned fuel mass for the third fuel injection event. The predetermined maximum combustion instability threshold is located and a corresponding desired burned fuel mass for the third fuel injection event is determined. As one having ordinary skill in the art will recognize, combustion instability is the inverse of COV of IMEP.

Referring back to FIG. 5, a total fuel mass for each engine cycle is determined based upon engine operating conditions and the operator torque request in step 225 of process 220. Combustion stability and NOx emissions profiles are selected based upon the engine operating conditions in step 230. The desired burned fuel mass for the first injection event in step 240 is determined based upon the predetermined maximum NOx emissions threshold as described hereinabove. The desired burned fuel mass for the third injection event in step 245 is determined based upon the predetermined maximum combustion instability threshold as described hereinabove.

After the desired burned fuel mass for the first and third fuel injection events are determined, desired fuel mass, and fuel injection and spark timing with respect to crank angle are determined for the third fuel injection event in step 255 and the first fuel injection event in step 260. The second injection is defined in step 265, NVO is adjusted in step 270, and commands 28 and 26 are generated in step 275.

Figure 8:
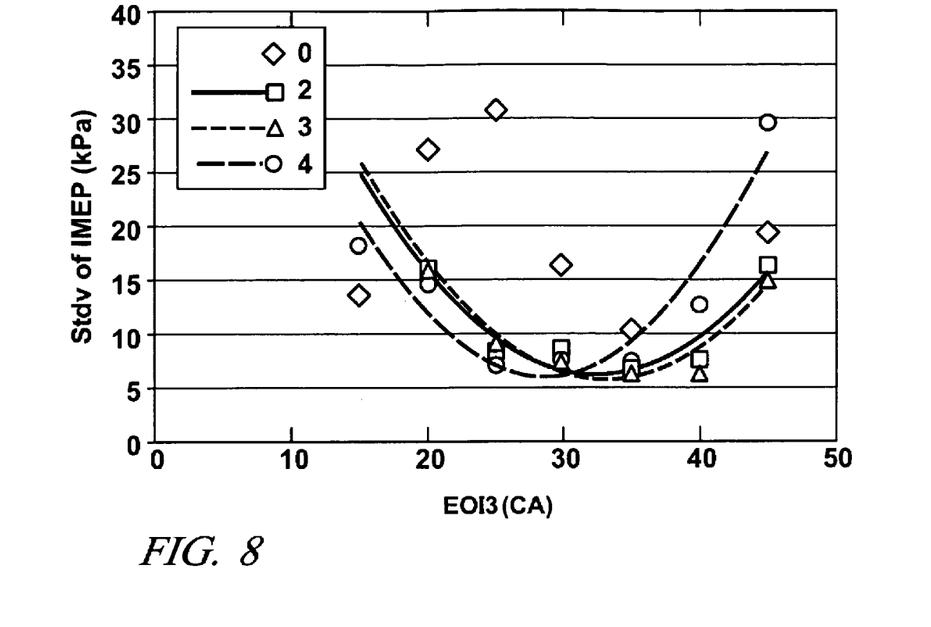
FIG. 8 graphically illustrates results of engine operating showing combustion stability as a function of fuel injection timing for different spark discharge timings, in accordance with the present disclosure.

FIG. 8 graphically illustrates results of engine operating showing combustion stability as a function of fuel injection timing for different spark discharge timings, in accordance with the present disclosure. FIG. 8 shows a fuel injection profile depicting fuel injection timing for the third fuel injection event as a function of crank angle degrees before TDC whereat a last fuel pulse ends for a predetermined injected fuel mass (EOI3(CA)). Spark discharge timings are indicated by elapsed crank angle after the last fuel pulse ends. Combustion stability with respect to fuel injection timing for the third fuel injection event may be experimentally determined for a specific hardware application for varying engine operating conditions, spark discharge timings, and injected fuel mass in one embodiment. Predetermined combustion stability profiles for fuel injection timings at ranges of engine operating conditions and spark discharge timings may be stored in memory of the control module 5.

In operation, the control module 5 determines fuel injection timing for the third fuel injection event based upon the desired burned fuel mass for the third injection event and combustion stability considerations. The control module 5 selects fuel injection profiles based upon the desired burned fuel mass, i.e., fuel injection profiles for injected fuel mass corresponding to a desired burned fuel mass. The control module 5 uses the remaining fuel injection profiles to determine the fuel injection and spark timing. The fuel injection timing and spark discharge timing for the third fuel injection event are determined based upon the profiles and combustion stability indicated by a maximum standard deviation of IMEP (Stdv of IMEP). Preferably, a fuel injection timing corresponding to a lowest standard deviation of IMEP below the maximum standard deviation of IMEP is selected.

Figure 9:
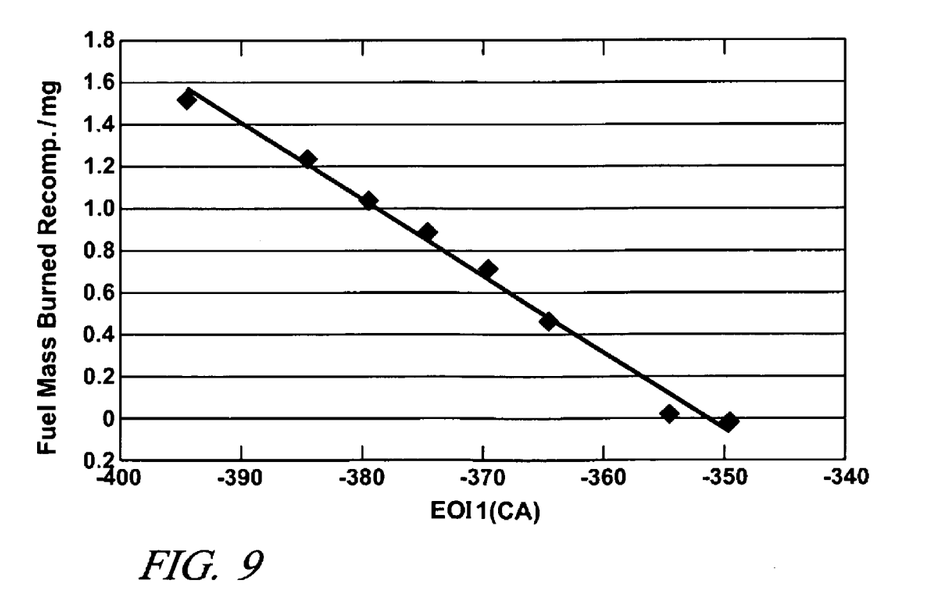
FIG. 9 graphically illustrates results of engine operating showing fuel mass burned during recompression as a function of fuel injection timing, in accordance with the present disclosure.

After fuel injection and spark discharge timing for the third fuel injection event are determined, fuel injection timing for the first fuel injection event is determined based upon a selected profile and the desired burned fuel mass for the first fuel injection event. FIG. 9 graphically illustrates results of engine operating showing fuel mass burned during recompression as a function of fuel injection timing, in accordance with the present disclosure. FIG. 9 depicts fuel injection timing for the first fuel injection event with respect to crank angle degrees whereat a last fuel pulse ends (EOI1(CA)). The relationship between the fuel mass burned during recompression and the timing of the end of the last fuel pulse is determined based upon experimental data and determined for a specific hardware application and for varying engine operating conditions. The relationship for ranges of engine operating conditions may be stored in memory of the control module 5 and then selected based upon monitored engine operating conditions. Spark discharge timing for the first fuel injection event is predetermined and is preferably executed immediately after the end of the last fuel pulse of the first fuel injection event. Fuel mass for the first fuel injection event is determined based upon a predetermined relationship between the desired burned fuel mass and injected fuel mass.

Figure 10:
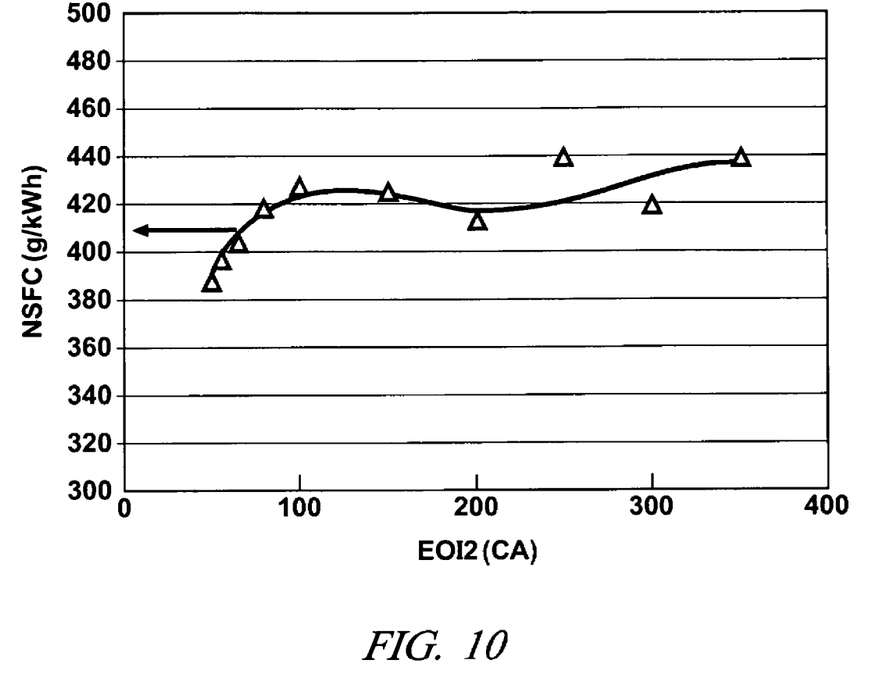
FIG. 10 graphically illustrates results of engine operating showing a relationship between fuel injection timing for the second fuel injection event and net specific fuel consumption, in accordance with the present disclosure.

FIG. 10 graphically illustrates results of engine operating showing a relationship between fuel injection timing for the second fuel injection event and net specific fuel consumption, in accordance with the present disclosure. FIG. 10 depicts fuel injection timing for the second fuel injection event with respect to crank angle degrees before TDC whereat a last fuel pulse ends. Relationships between net specific fuel consumption and a range of timing of the second fuel injection event for varying engine operating conditions can be determined based upon experimental data and determined for a specific hardware application in one embodiment. The relationships may be stored in memory of the control module 5 and then selected based upon monitored engine operating conditions. The timing of the second fuel injection event is determined based upon the selected relationship between the fuel injection timing for the second fuel injection event and net specific fuel consumption (265). A maximum net specific fuel consumption value is located in the range of timing for the second fuel injection event. The timing of the second fuel injection event is the crank angle corresponding to the minimum net specific fuel consumption value.

Fuel mass for the second fuel injection event is determined based upon the fuel mass for the first and third fuel injection events. The fuel mass for the second fuel injection event is the difference between the total fuel mass and the fuel mass for the first and third fuel injection events, i.e., a remaining fuel mass after subtracting the fuel mass for the first and third fuel injection events from the total fuel mass.

After the control scheme 200 determines fuel mass and spark timing for the first, second, and third fuel injection events, the control scheme 200 actuates the intake and exhaust valves 20 and 18 to achieve a predetermined NVO. The control module 5 actuates the fuel injectors 28 based upon the determined fuel mass and fuel timing, and discharges a spark via the spark plug 26 based upon the spark timing.

Figure 11:
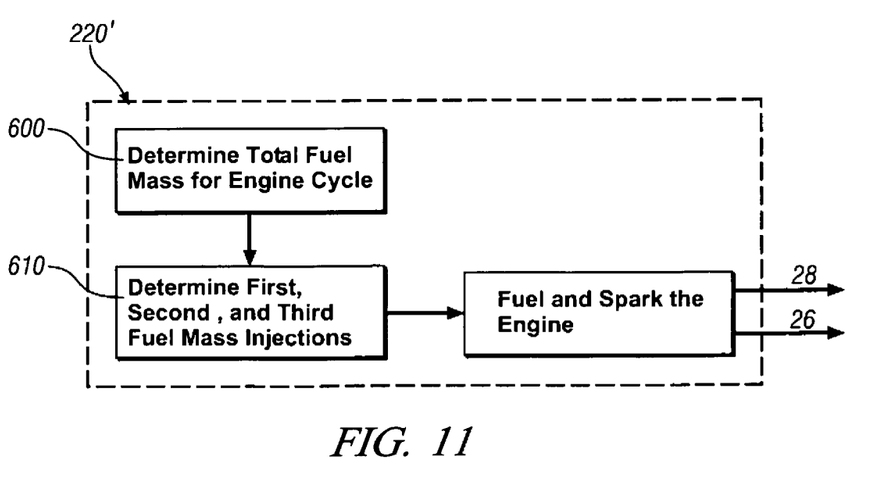
FIG. 11 shows an alternative method for determining the fuel mass for first, second, and third fuel injections events, in accordance with the present disclosure.

FIG. 11 shows an alternative method for determining the fuel mass for the first, second, and third fuel injections events, in accordance with the present disclosure. According to process 220', a total fuel mass for each engine cycle based upon cylinder conditions and the operator torque request is determined in step 600. The fuel mass for the first, second, and third fuel injection events is determined based upon the total fuel mass for the engine cycle in step 610. The total fuel mass for the engine cycle is divided by 3. The resultant is the fuel mass injected for each of the first, second, and third fuel injection events.

It is well known that HCCI operation is limited by its operating range. To further extend the low load operating limit of controlled auto-ignition combustion, a method for the control of low load HCCI combustion through MIMI operation is described above. The examples described above were achieved at fully warmed-up engine condition.

HCCI combustion requires a particular range of energy to be present in the air fuel charge in order to be effective. Energy present in the combustion chamber is driven largely by temperature within the chamber. Thermal conditions in the cylinder can be altered by valve timing, injection strategy including injection timing, and EGR % to achieve optimum phasing, stability and engine performance for each engine speed and load. However, valve timing, injection strategy, and EGR values calibrated to provide efficient engine operation in a fully warmed-up engine do not translate directly to an engine not-fully warmed-up. Less energy is present in a cold combustion chamber, for example, corresponding to coolant temperatures of 25° C., than in a fully warmed-up combustion chamber, for example, corresponding to coolant temperatures of 90° C. Therefore, valve timing, injection strategy, and EGR values must be modulated to compensate thermal conditions in a cold combustion chamber as compared to a fully warmed-up combustion chamber.

Engine calibration is a technique known in the art to test a particular engine configuration at an operating point and determine the correct settings for the engine to operate efficiently at that operating point. Calibration data can be collected iteratively to map engine operation through an operating range, and settings to operate an engine at various operating points throughout the range can be stored in memory, for example, in an engine control module. As described above, settings to efficiently operate an engine in HCCI mode, particularly, injection timing, spark timing, NVO, and air fuel ratio, change with combustion chamber temperature through a warm-up cycle between a cold combustion chamber and a fully warmed-up combustion chamber. However, calibrating engine operation for all operating points through an HCCI operating range iteratively at each point for increasing temperatures is an intensive process requiring significant testing and time.

Figure 12:
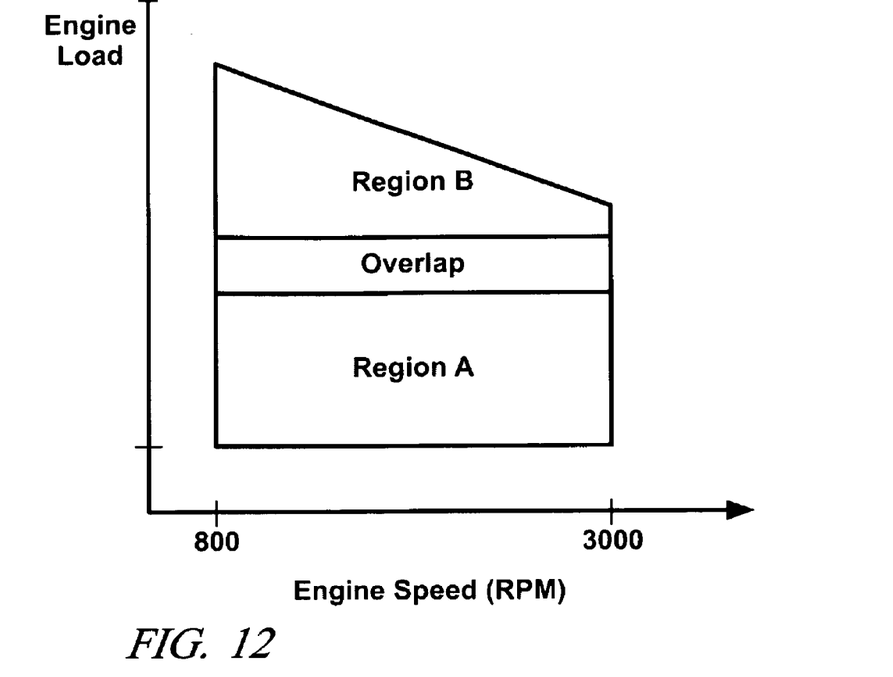
FIG. 12 graphically depicts an exemplary spark-assisted HCCI enabled warm-up operating range, in accordance with the present disclosure.

As described above, an engine can utilize different operating modes in different operating ranges. Spark-assisted HCCI operation is enabled in certain operating range, and strategies exist within portions of the spark-assisted HCCI enabled operating range to increase the size of the spark-assisted HCCI enabled operating range and improve efficiency, combustion stability, emissions and other factors within the spark-assisted HCCI enabled operating range. As described above, properties within the combustion chamber required to facilitate HCCI operating are different in a cold engine as opposed to in a fully warmed-up engine. Within the spark-assisted HCCI enabled operating range for a warmed-up engine, some portion of that range describes an operating range wherein spark-assisted HCCI operation is enabled for a cold engine. Such a sub region can be described as a spark-assisted HCCI enabled warm-up operating range. FIG. 12 graphically depicts an exemplary spark-assisted HCCI enabled warm-up operating range, in accordance with the present disclosure. As described above, different strategies are utilized to increase the size of the HCCI enabled operating range and improve efficiency, combustion stability, emissions and other factors within the HCCI enabled operating range. In some portions of the range, a single spark single injection (SISI) strategy can be used throughout a warm-up cycle, illustrated in FIG. 12 as region B. In some portions of the range, a MIMI strategy is enabled and required throughout a warm-up cycle, as illustrated in FIG. 12 in region A, corresponding to an area wherein lower engine loads require strategies such as reforming to create enough energy to facilitate HCCI operation. Additionally, another portion of the range includes an overlap region, as illustrated in FIG. 12, wherein either named HCCI operating strategy can be used throughout a warm-up cycle.

As described above, engine calibration is an intensive process, wherein operation of an exemplary engine at an operating point is utilized to select settings to operate an engine at the operating point. For example, in FIG. 12, an operating point can be defined at a fixed engine speed, a fixed engine load, and an engine temperature. Under known methods, in order to operate the engine through a warm-up cycle at a set engine speed and engine load, calibration points would have to be tested and stored for a series of temperatures from a cold engine temperature to a fully warmed-up temperature. For operation in a warm-up cycle wherein engine speed and engine load are not set at specific values, calibration points would have to be available at every engine speed and engine load experienced for the present engine temperature.

Each calibration affects a number of factors of engine operation, including energy present in the combustion chamber available to produce auto-ignition. Exemplary factors shown to control the energy present in the combustion chamber include an amount of fuel reformed, NVO, and air fuel ratio. In order to adequately control conditions within the combustion chamber to facilitate HCCI operation in a warm-up cycle, each of these factors or the selectable settings controlling these factors must be selected, for example, through calibration or iterative testing at points throughout the operating range.

Testing has shown, in regions wherein a single operating strategy may be employed throughout a warm-up cycle, for example, SISI or MIMI, that calibrated settings to operate the engine at a set engine speed and engine load tend to vary predictably between a cold engine temperature and a fully warmed-up engine temperature. A method is disclosed to operate an engine in a warm-up cycle, the operation in a spark-assisted HCCI mode, in an operating region wherein a single operating strategy can be utilized throughout the warm-up cycle by utilizing calibrated settings to operate the engine at various engine speeds and engine loads at a cold engine temperature and calibrated settings to operate the engine at various engine speeds and engine loads at a fully warmed-up engine temperature; monitoring engine speed and engine load, monitoring engine temperature, for example, through engine coolant temperature, oil temperature, or effective engine temperature; and determining settings to operate the engine by interpolating according to the monitored engine temperature between the settings to operate the engine calibrated at the monitored engine speed and load. Settings to operate the engine that can be interpolated to facilitate HCCI operation through a warm-up cycle depends upon the region being operated in. For example, in exemplary region A of FIG. 12, wherein MIMI operation is enabled, settings to operate the engine that can be expressed as functions of engine temperature include a first injection timing, a first spark timing, a third injection timing, a second spark timing, NVO, air fuel ratios, and fuel pressure. Similarly, in exemplary region B of FIG. 12, wherein SISI operation is enabled, settings to operate the engine that can be expressed as functions of engine temperature include an injection timing, a spark timing, NVO, air fuel ratios, EGR %, and fuel pressure. It will be noted that these settings that can be expressed as functions of engine temperature are an inclusive list of values that can be determined, and methods used herein need not express all such settings as functions of engine temperature to be in accordance with methods described herein.

Coolant temperature, oil temperature, or effective temperature can be used to estimate energy present in the combustion chamber and the resulting effects upon HCCI operation. Coolant temperature can be used based upon predictable behavior of temperature within the combustion chamber for given startup conditions. While a coolant temperature during startup does not accurately describe temperatures within the combustion chamber, the temperature within the combustion chamber can be correlated to engine temperatures in a warm-up cycle based upon a known engine speed and engine load or a change in coolant temperature per unit time. Similarly, oil temperature is not directly indicative of engine temperature but can be used to estimate engine temperature based upon the behavior of increasing oil temperature.

A method to track the effective temperature of the engine is disclosed. Engine power history can be used to estimate transient effects upon the temperature of portions of the engine. Engine power, describing the amount of heat and work energy released in the engine through combustion, tracked over a time span is descriptive of the heat input into the engine. The power history would be filtered based on a time constant that mimicked the thermal response of the structure. There are several ways to do this; for example, a running average or a weighted running average can be implemented. A comparison of the temperature history would be used to estimate either the current surface temperature or the difference between the current surface temperature and the expected steady state value. Warm-up, the cycle through which the engine is first operated, is an example of a period wherein a strong thermal transient is evident in the engine. A second method to estimate effective temperature of the engine to keep track of the fuel flow history instead of the power history. Testing shows that the fuel flow rate is an excellent predictor of engine heat transfer and temperatures. In this way, fuel flow rate can be used as a surrogate for engine power.

MIMI, as described above, includes multiple injection events. In the above exemplary three injection cycle, a first injection is described during an NVO period controlling an amount of reforming in the combustion cycle, thereby adding heat energy to the combustion chamber. A third injection is also described, controlling combustion stability for the combustion cycle. Finally, a second injection or series of injections described collectively as a second injection is used to control work output from the combustion cycle.

Figure 13:
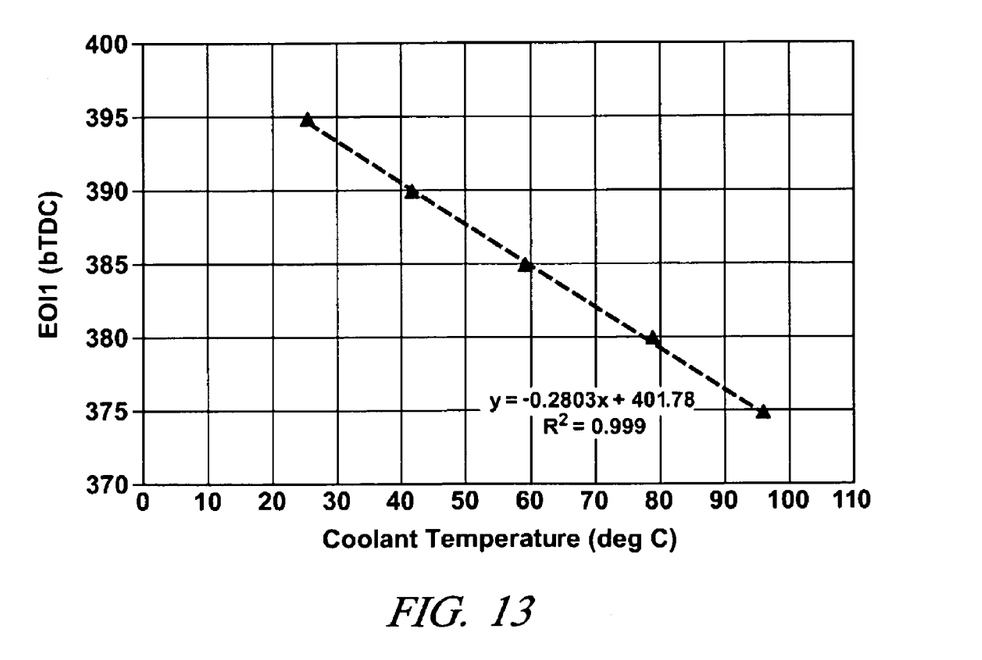
FIG. 13 graphically depicts five injection timings for a first injection selected by engine calibration through a series of engine coolant temperatures in a warm-up cycle.
Figure 14:
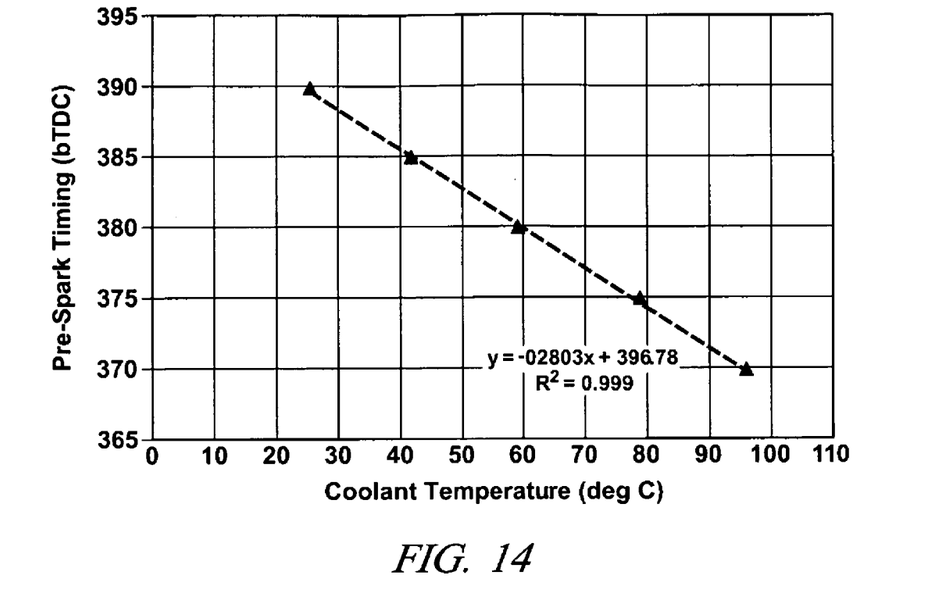
FIG. 14 similarly graphically depicts five injection timings for a first injection selected by engine calibration through a series of engine coolant temperatures in a warm-up cycle.

In an engine utilizing MIMI in a region wherein MIMI is enabled throughout the warm-up cycle, testing has shown that calibrated settings utilized to control the engine can be estimated based upon calibrated settings selected at a cold engine temperature and setting selected at fully warmed-up engine temperature. FIGS. 13 and 14 describe a functional relationship for injection timing and spark timing during recompression in an engine utilizing MIMI through a range of coolant temperatures, in accordance with the present disclosure. FIG. 13 graphically depicts five injection timings for a first injection selected by engine calibration through a series of engine coolant temperatures in a warm-up cycle. As is evident in the data, the five points describe a linear relationship between timing of the first injection and coolant temperature for the exemplary engine utilized in the calibration testing. While this exemplary engine yielded results describing a linear relationship, it will be appreciated that different engines can exhibit different behaviors. Simple calibration testing, however, can be utilized to describe a functional relationship between timing of the first injection and coolant temperature for an engine operating point. Analysis of exemplary results at different operating points can be further utilized to reinforce behavior of the setting through the range of possible operating points.

FIG. 14 similarly graphically depicts five injection timings for a first injection selected by engine calibration through a series of engine coolant temperatures in a warm-up cycle. As is evident in the data, the five points describe a linear relationship between timing of the spark utilized during recompression and coolant temperature for the exemplary engine utilized in the calibration testing. While the illustrated relationship is linear, it will be understood that a functional relationship between spark timing during recompression and coolant temperature can be described by different functional relationships, depending upon the particular engine.

Figure 15:
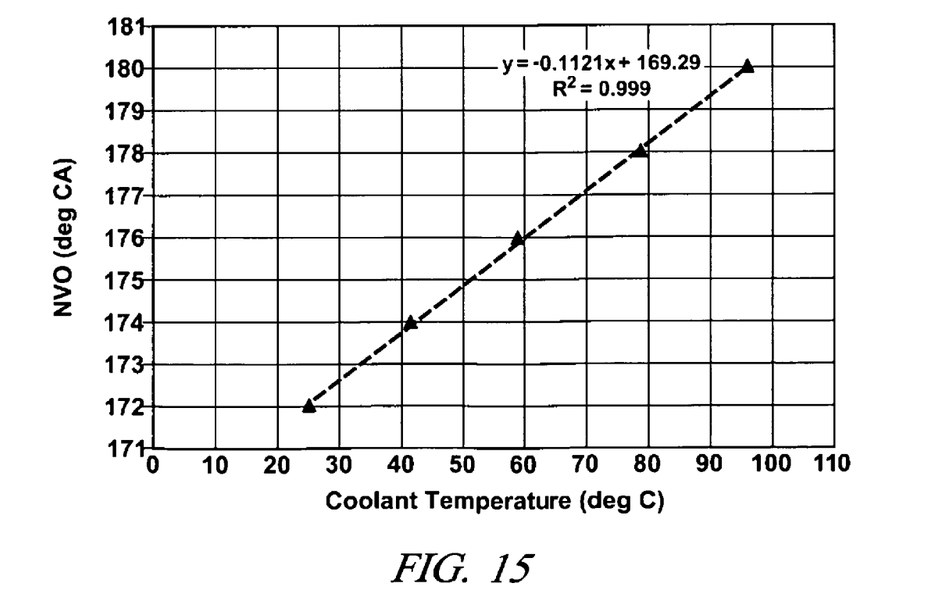
FIG. 15 graphically depicts five NVO durations selected by engine calibration through a series of engine coolant temperatures in a warm-up cycle.
Figure 16:
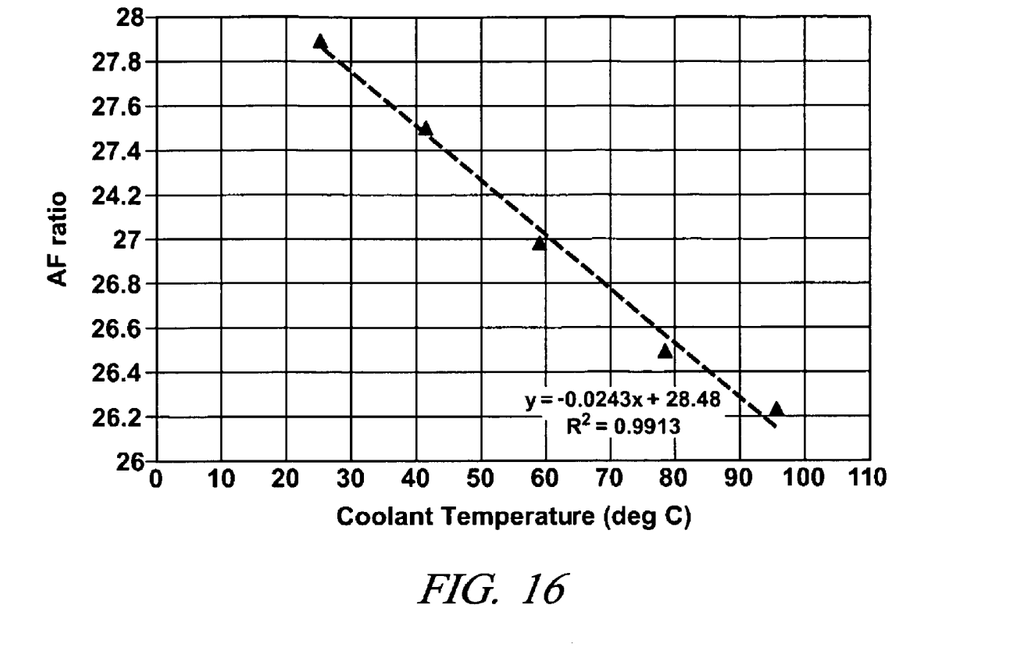
FIG. 16 graphically depicts five NVO durations selected by engine calibration through a series of engine coolant temperatures in a warm-up cycle.

It will be appreciated that NVO and air fuel ratio are engine settings that must be adjusted during engine calibration in order to control emissions and combustion stability. FIGS. 15 and 16 describe a functional relationship for NVO and AF ratio, respectively, through a range of coolant temperatures, in accordance with the present disclosure. FIG. 15 graphically depicts five NVO durations selected by engine calibration through a series of engine coolant temperatures in a warm-up cycle. FIG. 16 graphically depicts AF ratio settings selected by engine calibration through a series of engine coolant temperatures in a warm-up cycle. Similarly to FIGS. 13 and 14, results of FIGS. 15 and 16 confirm that optimally selected NVO and air fuel ratio settings between the cold and fully warmed-up engine temperatures at the tested engine speed and engine load are predictable based upon engine temperature. In this way, by selectively testing engine operation at points within an operating range allowing operation in a single operating strategy through the warm-up cycle, functional relationships can be described to select injection timing for a reforming event, spark timing for a reforming event, NVO and air fuel ratio according to monitored engine temperature.

In a region wherein operation in SISI mode is enabled throughout the warm-up period, fewer settings to control the engine are available for adjustment. No reforming is performed in this region, so no first injection timing and no first ignition timing exist to be modulated. However, settings to operate the engine that can be expressed as functions of engine temperature in an SISI region include an injection timing, a spark timing, NVO, air fuel ratios, EGR %, and fuel pressure. As described above, behavior of these settings can be interpolated based upon calibration points at the temperature extremes and represented as a functional relationship dependant upon engine temperature in a range wherein SISI operation is possible throughout a warm-up cycle.

Other settings to operate an engine through a warm-up cycle may not be selectable as a function of engine temperature. For example, events occurring near TDC, for example, the second injection event described in the exemplary MIMI operation above, can be a parameter important to combustion stability regardless of engine temperature. Therefore, such parameters should be maintained independent of coolant temperature.

Other strategies known to improve HCCI operation can be utilized in accordance with the methods described herein. One such exemplary strategy includes utilizing fuel line pressure lower than a standard fuel pressure to improve combustion stability at light load and idle operation. Exemplary testing has shown that halving a normally operative fuel pressure at the lower load regions of HCCI operation improves combustion stability at steady state. Lower fuel pressure, for example, in a region enabling MIMI operation described above, can be calibrated at cold temperature and calibrated at a fully warmed-up temperature, and operation between these points can be selectably controlled according to functional relationships describing settings to control the engine as a function of engine temperature.

Figure 17:
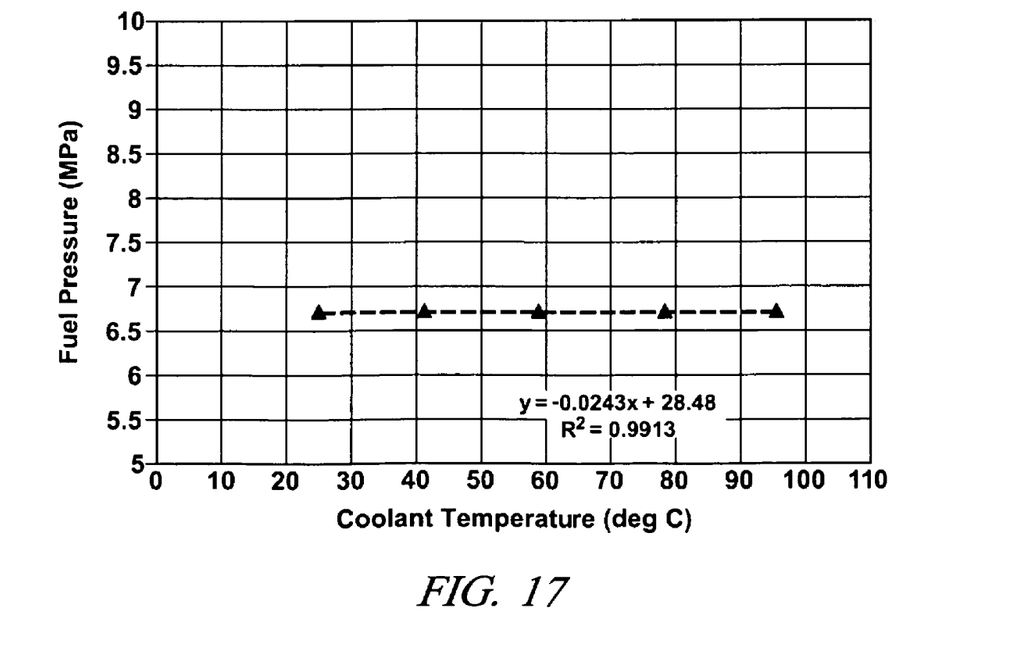
FIG. 17 graphically depicts five fuel pressure settings selected by engine calibration through a series of engine coolant temperatures in a warm-up cycle, in accordance with the present disclosure.

FIG. 17 graphically depicts five fuel pressure settings selected by engine calibration through a series of engine coolant temperatures in a warm-up cycle, in accordance with the present disclosure. The depicted fuel pressure comprises a fuel pressure lower than a normal operational fuel pressure for the tested engine configuration, and the depicted warm-up cycle includes HCCI operation at a low load condition. As is evident in the test data, the lower fuel pressures were selectable throughout the warm-up period.

Figure 18:
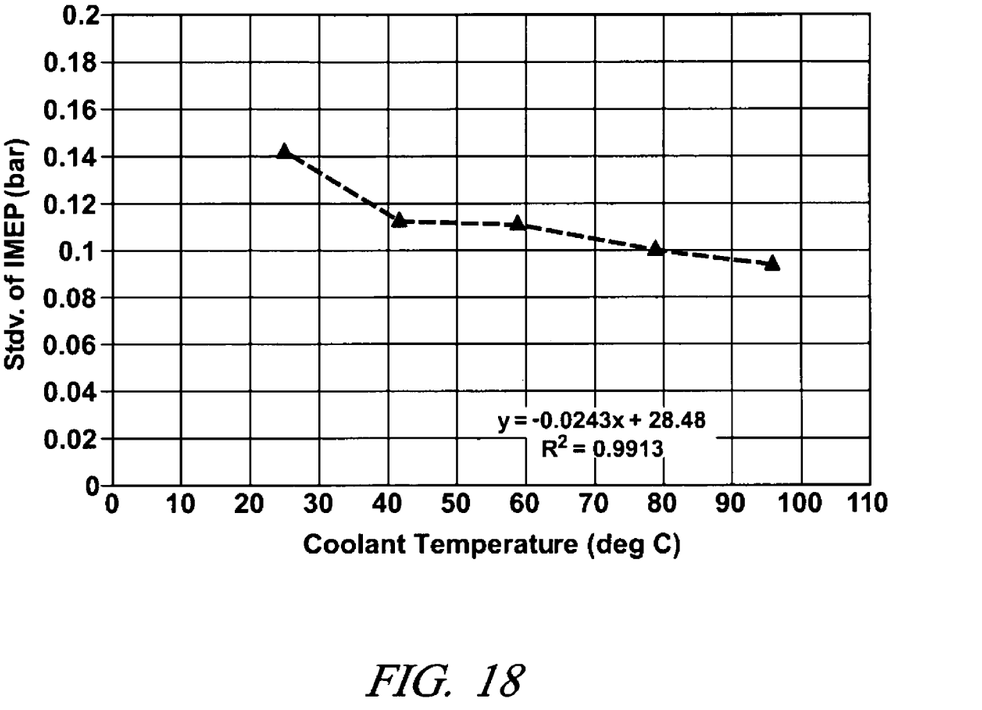
FIG. 18 graphically depicts resulting combustion stability values, judged by standard deviation of IMEP, through a warm-up cycle, in accordance with the present disclosure.

FIG. 18 graphically depicts resulting combustion stability values, judged by standard deviation of IMEP, through a warm-up cycle, in accordance with the present disclosure. Although combustion stability varies through the cycle, the results depicted describe stability values that fall within an acceptable range. Such results can be tested and monitored in order to confirm that settings to control the engine selected through a warm-up period conform to required engine performance metrics, such as combustion stability.

As described above, the functional relationship of settings to control the engine can be determined by analyzing test points selected between the cold engine temperature and fully warmed-up engine temperature. Such a function can be determined, for example, by curve fitting a functional expression to the cold temperature point, the fully warmed-up temperature point, and tested temperature points between. Such curve fitting can then be performed at different engine speeds and loads, and results describing functional relationships at tested engine speeds and loads can be used to estimate functional relationships between the tested engine speeds and loads through an operating range. For example, testing at different engine speeds and loads can show that injection timing for reforming is a linear functional relationship through various engine speeds and loads. In another example, air fuel ratio, through testing at different engine speeds and loads, might show to be nearly linear at lower engine speeds but exhibit a more pronounced second order relationship at higher engine speeds. Such a method, testing points between the extreme temperatures and sampling different temperatures, can include far fewer test points than a full calibration cycle. In the alternative to testing points between the extreme temperatures, the functional relationships can be developed experimentally, empirically, predictively, through modeling or other techniques adequate to accurately predict engine operation in HCCI mode, and a multitude of calibration curves might be used by the same engine for each cylinder and for different engine settings, conditions, or operating ranges.

The above methods describe utilizing a functional relationship to select settings to operate an engine in a region wherein a single operating strategy can be employed through an entire warm-up cycle. However, it will be appreciated that operation of the engine at any instant is not dependent upon the engine actually staying in the present operating range through the remainder of the warm-up cycle. For example, an engine warming up under idle or low load conditions falling within an SISI or MIMI range can operate according to methods described herein. If the engine subsequently changes operation such that the engine is no longer in the same region, the settings utilized to operate the engine can be selected according to other known methods, for example, through calibrated settings available in the control module through look-up tables. If the same engine later reenters the first region or a region contemplated in the methods disclosed herein, settings to operate the engine can again be selected according to methods described herein. For example, an engine could start in an operating region wherein MIMI operation would be possible through a warm-up period. Such a region is illustrated in region A of FIG. 12, described above. In this initial operation, settings could be selected according to a calibrated point in MIMI operation at cold engine temperature and a calibrated point at fully warmed-up engine temperature, with settings selected according to a predetermined functional relationship according to a measured engine temperature. The same engine could then increase load into an operating range wherein SISI mode is possible and preferred throughout the warm-up cycle. Such a region is illustrated in region B of FIG. 12, described above. The settings could then be determined according to methods described herein, according to a calibrated point in SISI operation at cold engine temperature and a calibrated point at fully warmed-up engine temperature, with settings selected according to a predetermined functional relationship according to the measured engine temperature. In this way, the methods described herein can be used to control settings utilized to control the engine through transitory operation. It will be appreciated by one having ordinary skill in the art that transitioning between operating modes can include significant changes in factors such as NVO and air fuel ratio, and methods known in the art may have to be employed in the transition to maintain proper combustion through the transition.

While the invention has been described by reference to certain embodiments, it should be understood that changes are allowable within the spirit and scope of the inventive concepts described. Accordingly, it is intended that the invention not be limited to the disclosed embodiments, but that it have the full scope permitted by the language of the following claims.

The invention claimed is:

1. Method for controlling an internal combustion engine in a spark-assisted homogeneous charge compression ignition mode in a warm-up cycle in an operating region wherein a current engine state comprising an engine speed, an engine load, and an engine temperature indicates a single operating strategy can be utilized throughout the warm-up cycle, the method comprising:
   operating the engine in the spark-assisted homogeneous charge compression ignition mode;
   monitoring the engine speed;
   monitoring the engine load;
   monitoring the engine temperature;
   determining that the single operating strategy can be utilized throughout the warm-up cycle based upon the monitored engine speed, the monitored engine load, and the monitored engine temperature;
   determining settings to operate the engine by interpolating according to the monitored engine temperature between settings to operate the engine at the monitored engine speed and load calibrated at a cold engine temperature and settings to operate the engine at the monitored engine speed and load calibrated at a fully warmed-up engine temperature; and
   utilizing the determined settings to control operation of the engine.

2. The method of claim 1, wherein determining the settings to operate the engine comprises determining a negative valve overlap.

3. The method of claim 1, wherein determining the settings to operate the engine comprises determining an air fuel ratio.

4. The method of claim 1, wherein determining the settings to operate the engine comprises determining a fuel line pressure.

5. The method of claim 1, wherein the single operating strategy comprises single injection single ignition operation; and wherein determining the settings to operate the engine comprises determining an injection timing and an ignition timing.

6. The method of claim 1, wherein the single operating strategy comprises single injection single ignition operation; and wherein determining the settings to operate the engine comprises determining an exhaust gas recirculation percentage.

7. The method of claim 1, wherein the single operating strategy comprises multiple injection multiple ignition operation; and wherein determining the settings to operate the engine comprises determining a first injection timing during a recompression and a first ignition timing during the recompression.

8. The method of claim 1, wherein the single operating strategy comprises multiple injection multiple ignition operation comprising three injection events; and wherein determining the settings to operate the engine comprises determining a third injection timing.

9. The method of claim 1, wherein the single operating strategy comprises multiple injection multiple ignition operation; and wherein determining the settings to operate the engine comprises determining a second ignition timing.

10. The method of claim 1, wherein monitoring the engine temperature comprises monitoring an engine coolant temperature.

11. The method of claim 1, wherein the interpolating according to the monitored engine temperature comprises interpolating linearly.

12. The method of claim 1, wherein the interpolating according to the monitored engine temperature comprises utilizing a functional relationship based upon the monitored engine temperature.

13. The method of claim 12, wherein the functional relationship is based upon sampled testing between the cold engine temperature and the fully warmed-up engine temperature.

14. Method for controlling an internal combustion engine in a spark-assisted homogeneous charge compression ignition mode, the method comprising:
   operating the engine in the spark-assisted homogeneous charge compression ignition mode;
   monitoring an engine speed;
   monitoring an engine load;
   monitoring an engine temperature; and
   when the engine speed and the engine load indicate that the engine can be operated in a single operating strategy at the engine speed and engine load through a remainder of a warm-up cycle, determining settings to operate the engine by interpolating according to the monitored engine temperature between settings to operate the engine at the monitored engine speed and load calibrated at a cold engine temperature and settings to operate the engine at the monitored engine speed and load calibrated at a fully warmed-up engine temperature and utilizing the determined settings to control operation of the engine.

15. The method of claim 14, wherein the single operating strategy comprises single injection single ignition operation; and wherein determining the settings to operate the engine comprises determining a negative valve overlap, an air fuel ratio, an injection timing, an ignition timing, a fuel line pressure, and an exhaust gas recirculation percentage.

16. The method of claim 14, wherein the single operating strategy comprises multiple injection multiple ignition operation; and wherein determining the settings to operate the engine comprises determining a negative valve overlap, an air fuel ratio, first injection timing, a first ignition timing, a third injection timing, a second ignition timing, and a fuel line pressure.

17. System to control an internal combustion engine in a spark-assisted homogeneous charge compression ignition mode in a warm-up cycle, the system comprising:
   the engine operating in the spark-assisted homogeneous charge compression ignition mode; and
   an engine control module, configured to
      monitor an engine speed,
      monitor an engine load,
      monitor an engine temperature,
      determine the engine to be operating in a region wherein the engine can be operated in a single operating strategy at the engine speed and engine load through a remainder of the warm-up cycle, and
      when the engine is in the region, determine settings to operate the engine by interpolating according to the monitored engine temperature between settings to operate the engine at the monitored engine speed and load calibrated at a cold engine temperature and settings to operate the engine at the monitored engine speed and load calibrated at a fully warmed-up engine temperature and control the engine based upon the determined settings.

18. The system of claim 17, wherein the interpolating according to the monitored engine temperature comprises interpolating linearly.

19. The system of claim 17, wherein the interpolating according to the monitored engine temperature comprises utilizing a functional relationship based upon the monitored engine temperature.

20. The system of claim 19, wherein the functional relationship is based upon sampled testing between the cold engine temperature and the fully warmed-up engine temperature.

* * * * *